United States Patent
Kazirskis et al.

(10) Patent No.: US 9,546,551 B2
(45) Date of Patent: Jan. 17, 2017

(54) REPAIRED TURBINE ROTOR WHEEL DOVETAIL AND RELATED METHOD

(71) Applicant: General Electric Company, Schenectady, NY (US)

(72) Inventors: Benedict Kazirskis, Acworth, GA (US); Lawrence Michael Grycko, Lockport, IL (US)

(73) Assignee: General Electric Company, Schenectady, NY (US)

( * ) Notice: Subject to any disclaimer, the term of this patent is extended or adjusted under 35 U.S.C. 154(b) by 677 days.

(21) Appl. No.: 14/028,970

(22) Filed: Sep. 17, 2013

(65) Prior Publication Data
US 2015/0078904 A1    Mar. 19, 2015

(51) Int. Cl.
| | |
|---|---|
| *F01D 5/02* | (2006.01) |
| *B23P 6/00* | (2006.01) |
| *F01D 5/00* | (2006.01) |
| *F01D 5/06* | (2006.01) |
| *F01D 5/30* | (2006.01) |
| *B23K 31/02* | (2006.01) |

(52) U.S. Cl.
CPC .............. *F01D 5/02* (2013.01); *B23K 31/02* (2013.01); *B23P 6/005* (2013.01); *F01D 5/005* (2013.01); *F01D 5/06* (2013.01); *F01D 5/303* (2013.01); *B23K 2201/001* (2013.01); *F05D 2230/232* (2013.01); *F05D 2230/80* (2013.01); *Y10T 29/49318* (2015.01)

(58) Field of Classification Search
CPC ............ F01D 5/02; F01D 5/303; F01D 5/005; F01D 5/06; F01D 5/063; F01D 5/025; F01D 5/3061; F05D 2230/80; F05D 2230/232; B23K 9/0213; B23K 31/02; B23P 6/005
See application file for complete search history.

(56) References Cited

U.S. PATENT DOCUMENTS

| | | | | |
|---|---|---|---|---|
| 2,384,919 | A | * | 9/1945 | Walter ................. B23K 9/0026 219/137 R |
| 2,638,312 | A | * | 5/1953 | Jedrzykowski ......... F01D 5/021 228/246 |
| 3,554,668 | A | * | 1/1971 | Wagle ....................... F01D 5/06 416/198 A |
| 4,796,343 | A | * | 1/1989 | Wing ................... B23K 20/021 29/889.21 |
| 4,940,390 | A | | 7/1990 | Clark et al. |
| 5,511,949 | A | * | 4/1996 | Thore .................. B23K 33/004 416/204 A |
| 6,022,194 | A | * | 2/2000 | Amos ....................... F01D 5/02 29/889.21 |
| 6,049,979 | A | | 4/2000 | Nolan et al. |

(Continued)

*Primary Examiner* — Igor Kershteyn
*Assistant Examiner* — Eldon Brockman
(74) *Attorney, Agent, or Firm* — Nixon & Vanderhye P.C.

(57) ABSTRACT

A method of repairing a damaged dovetail on a peripheral portion of a turbine wheel includes the steps of removing buckets from the dovetail; removing a damaged dovetail from the peripheral portion of the turbine wheel, leaving a rotor wheel body having a peripheral rim; disposing a replacement ring about the peripheral rim, the replacement ring and the rim defining therebetween a pair of end grooves and a center section; and welding the replacement ring to the peripheral rim, with weld material applied only within the end grooves, leaving a void in the center section.

20 Claims, 6 Drawing Sheets

(56) References Cited

U.S. PATENT DOCUMENTS

| | | | | |
|---|---|---|---|---|
| 6,065,344 A * | 5/2000 | Nolan | ............... | B23K 9/0026 |
| | | | | 73/583 |
| 6,115,917 A * | 9/2000 | Nolan | ............... | B23K 9/0026 |
| | | | | 29/402.08 |
| 6,128,820 A * | 10/2000 | Nolan | ............... | B23K 9/0026 |
| | | | | 29/402.13 |
| 6,168,382 B1 * | 1/2001 | Nolan | ............... | B23K 9/0026 |
| | | | | 416/213 R |
| 6,494,683 B1 * | 12/2002 | Nolan | ............... | B23K 9/0026 |
| | | | | 29/889.1 |
| 2011/0229339 A1 * | 9/2011 | Yamada | ............... | F01D 5/06 |
| | | | | 416/244 R |

* cited by examiner

REPAIRED TURBINE ROTOR WHEEL DOVETAIL AND RELATED METHOD

BACKGROUND OF THE INVENTION

The present invention generally relates to the repair of turbine rotor wheels and particularly the dovetails used for securing buckets or blades to the rotor wheels. The invention is particularly applicable to the repair of both steam turbine and gas turbine rotors.

Steam and gas turbines typically used for power generation are comprised of multiple stages each defined by alternating rows of stationary nozzle vanes and turbine buckets or blades mounted on wheels fixed to the turbine rotor. The buckets are conventionally attached to the wheels by a dovetail connection. A number of different types of dovetails may be employed. For example, in finger-type dovetails that enable radial loading of buckets onto the wheel, the outer periphery of the rotor wheel has a plurality of axially-spaced circumferentially-extending, stepped grooves for receiving complementary fingers on each of the bucket dovetails. After the buckets are stacked about the rotor wheel, pins are typically passed through aligned openings in the fingers of each of the bucket dovetails and the groove walls in the wheel to secure the buckets to the wheel. Other types of dovetails (male or female) have generally pine-tree shapes, which enable tangential or axial loading of the buckets, depending on the orientation of the dovetails.

In any event, the dovetail connections between the buckets and wheels are highly stressed and, after years of operation, may wear out and/or crack. On low pressure steam turbine rotors, cracking occurs typically as a result of stress corrosion. In high pressure steam turbine rotors, cracking typically occurs as a result of creep rupture and/or low cycle fatigue. It will be appreciated that the magnitude of the stresses in the rotor wheel are very substantial at the radially outward location of the wheel dovetail because of stress concentration factors developed by the dovetail geometry. That is, peak stresses are significantly higher in the wheel dovetail as compared with locations radially inwardly of dovetails. For example, the pin openings in the finger-type dovetail and the machined areas of the wheel defining the fingers concentrate the stresses in the dovetail area and, over time, may cause cracking as a result of one or more of the aforementioned failure mechanisms.

In the past, the utility operator, upon inspection of the rotor and identification of a significant crack in one or more of the turbine wheels, particularly at the dovetail connections had essentially two choices: the entire rotor could be replaced, or the damaged rotor wheel could be repaired by employing a conventional weld buildup process. The first option is costly and may involve considerable downtime before a new rotor is available for installation. For that reason, removal of the damaged dovetail from the rotor wheel and replacement of the removed dovetail with built-up weld material has been the principal repair method of choice.

In a typical weld buildup process, the rotor is first removed from the turbine and the buckets are removed from the damaged wheel. The damaged dovetail portion of the wheel is then removed, leaving a blank outer rim. As used herein, "dovetail" in the context of what is removed and replaced, refers to an outer portion of the wheel that incorporates all of the individual bucket dovetails, unless otherwise noted.

Weld material is applied to the rim in multiple passes to provide a weld build-up, which can later be machined to provide replacement dovetails. The weld material can be the same as or different from the material from which the rotor wheel is made. For example, in U.S. Pat. No. 4,940,390, a GTAW process is used to deposit a weld metal of 12 Cr material onto a Ni—Cr—Mo—V rim. 12 Cr material is much more resistant to stress corrosion cracking than the Ni—Cr—Mo—V material. However, welding processes in general are prone to defects such as porosity and slag inclusions in the weld metal, and it is difficult to optimize the properties of the weld material when it is being deposited on the wheel rim.

There are also specific limitations on the buildup of weld material on a wheel, which render turbine rotor wheel build-ups as a method of repair only marginally satisfactory as explained in commonly-owned U.S. Pat. No. 6,049,979.

In the '979 patent, there is described a dovetail repair process for a turbine rotor which, instead of a weld build-up repair, provides a ring replacement, typically a forging, for the entirety of the damaged dovetail. The forged replacement ring, provided in segmented form or as a full 360° annular ring, can be formed of the same or improved materials in comparison with the original rotor so as to provide improved resistance to the various failure mechanisms noted above. The replacement ring is beneficially virtually free of defects, which might otherwise be extant in repaired dovetail characterized by a weld build-up of the same or similar material. Also, the material of the replacement ring is not a function of the welding process or the weld material employed to secure the ring to the rim of the wheel body after the damaged dovetail has been removed. Consequently, the forged replacement ring can be formed of materials which provide optimum properties for resistance to one or more of the different types of failure mechanisms. For example, for rotors formed of Ni—Cr—Mo—V or Cr—Mo—V or 12 Cr, a 12 Cr material such as 12% CrCb or an Inconel-based material can be employed. The weld material can be any weld material, which is compatible with both the base material and the forged replacement ring material, for example, a 12 Cr—Ni—Mo. The nature of the weld material is less significant to the welding process employed in this case because the weld is formed along a relatively low stress area of the wheel and the only purpose of the weld is to join the wheel and the ring. That is, the weld material is not required to be as resistant to high stresses as is the dovetail per se.

As further described in the '979 patent, the substantially defect-free replacement forged ring can be welded to the rim of the wheel body by a FineLine™ welding technique. Characteristic of the FineLine™ welding technique is the provision of a substantially linearly extending non-beveled extremely narrow groove which does not introduce significant porosity or slag into the weld material and which is relatively unsusceptible to welding problems with welding materials usually considered difficult to weld. By using the FineLine™ welding technique and locating the weld in a low stress region of the wheel, the forging can be formed of the most optimal material and the material can be selected to increase the strength and damage-resistant properties, e.g., by using forgings of relatively high carbon, columbium and other favorable materials.

In terms of repairing a damaged dovetail, once it has been determined that the rotor is in need of repair, the rotor is lifted from the turbine and placed on a horizontal axis upon bearings enabling motorized rotation of the rotor, i.e., the damaged rotor is placed in a lathe. The buckets on the rotor wheel requiring a dovetail repair are removed, for example, by removing the pins of the finger-type dovetail, the buckets thereby being removable in a radial outward direction. The damaged dovetail is then removed from the wheel by a machine tool operation, leaving a wheel body having a reduced diameter rim. The annular cut through the wheel to remove the damaged dovetail is made at a relatively low stress location about the wheel, i.e., radially inwardly of the dovetail. Weld preps are provided on both the wheel rim and the I.D. of a replacement ring. The ring, of course, is previously fabricated of the desired material and sized for the wheel body on which it will form the dovetail replacement. The ring is preferably formed either in multiple sections, for example, two 180° sections, or as a 360° ring and is applied about the rim of the rotor and temporarily secured, for example, by tack welding or bolting.

Once the welding is complete, and in the case of a segmented ring, the ends of the ring sections are butt-welded to one another. Upon completion of the butt-weld, the blocks are cut from the ring and the butt-welding head is removed.

A stress relief is then performed with the rotor oriented horizontally or vertically, depending on available equipment. Induction coils (or other suitable means) provide a heat treatment to the ring and rotor at selected elevated temperatures, thereby stress-relieving the weld. The rotor is then cooled down at a controlled rate by controlling the heat applied to the rotor. A final ultrasonic inspection of the cold rotor is then effected. Assuming the welds are without defect, the cutting machine is next employed to form the dovetails in the forged ring now welded to the rotor wheel body. In a finger-type dovetail, a milling head is secured to the machine and cuts the fingers in the outer surface of the ring. After forming the dovetail, the annular welds are typically shot-peened to introduce compressive stresses along the outer surfaces of the welds. These compressive stresses increase the resistance of the material to stress corrosion cracking. Subsequent to shot-peening, the buckets are disposed in the new dovetails and the rotor is balanced. The repaired rotor is then placed back into service.

Even with the advantages of the weld repair processes described in the '979 patent, however, a need has developed for even greater weld efficiencies as well as greater utilization of opportunities provided by the use of replacement rings on rotor wheels in terms of accommodating new dovetail designs that may be incorporated into the repair process.

BRIEF DESCRIPTION OF THE INVENTION

In one exemplary but nonlimiting embodiment, the invention provides a method of repairing a damaged dovetail on a peripheral portion of a turbine wheel comprising the steps of: (a) removing buckets from the dovetail; (b) removing a damaged dovetail from the peripheral portion of the turbine wheel, leaving a rotor wheel body having a peripheral rim; (c) disposing a replacement ring about the peripheral rim, the replacement ring and the peripheral rim defining therebetween a pair of end grooves and a center section; and (d) welding the replacement ring to the peripheral rim, with weld material applied only within the end grooves, leaving a void in the center section.

In another exemplary but nonlimiting aspect, the invention relates to a method of repairing a turbine rotor wheel dovetail comprising the steps of: (a) removing buckets from the dovetail; (b) removing the dovetail from a peripheral portion of the turbine wheel, leaving a rotor wheel body having a radially-outer peripheral rim of a first material; (c) disposing a one-piece 360° replacement ring of a second different material about the wheel body, the replacement ring engaged with the peripheral rim, the replacement ring and the peripheral rim having an interface defined by a pair of end grooves and a hollow center section; and (d) welding the replacement ring to the rotor wheel, with weld material applied only within the end grooves, leaving a void in the center section.

In another exemplary but nonlimiting embodiment, the invention provides a turbine rotor wheel comprising an outer dovetail portion welded to a body portion, wherein a welded interface between the outer dovetail portion and the body portion is formed by a pair of partial-penetration welds separated by a hollow center section.

The invention will now be described in greater detail in connection with the drawings identified below.

DETAILED DESCRIPTION OF THE INVENTION

Figure 1:
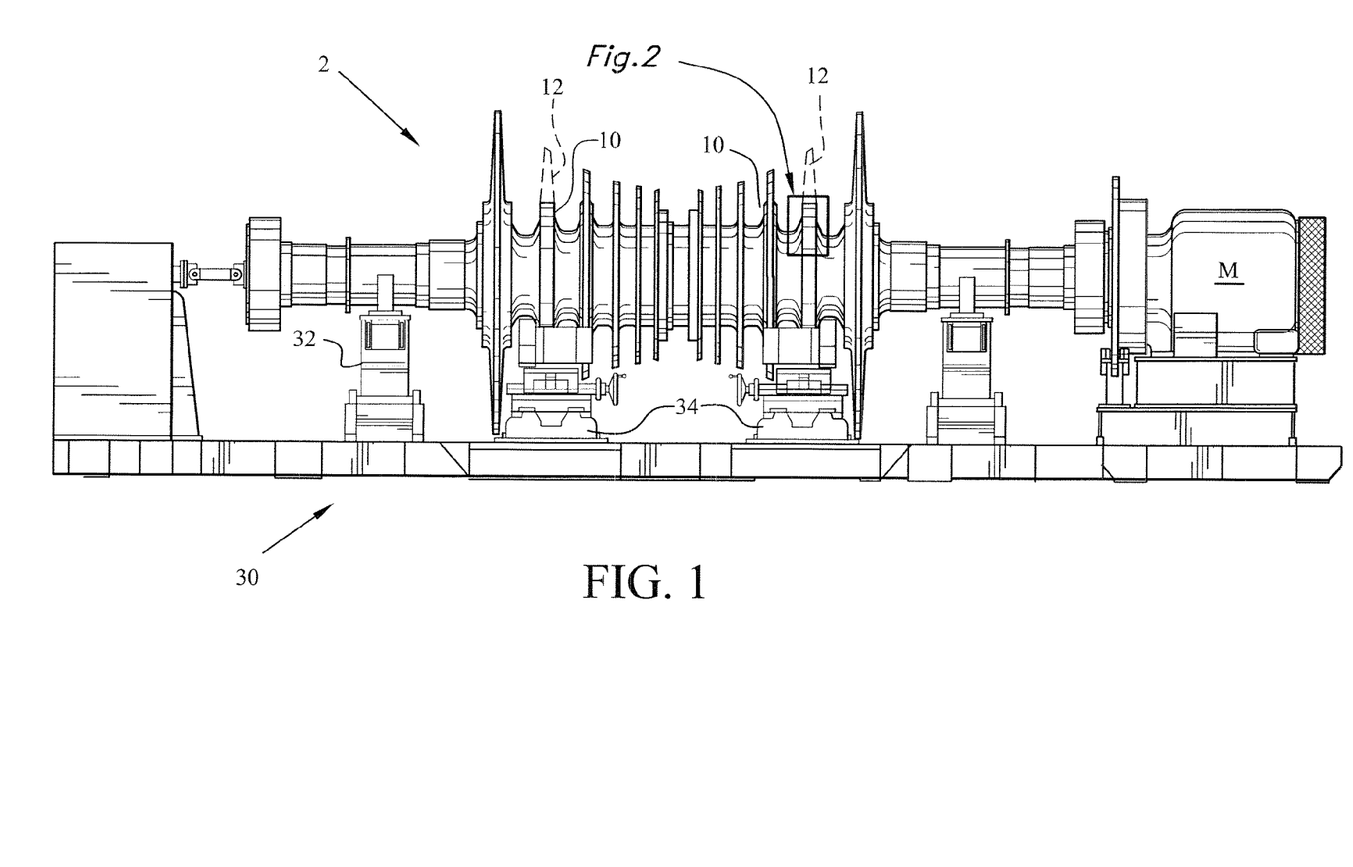
FIG. 1 is a side elevational view of an apparatus according to the present invention for use in repairing rotor wheel dovetails and illustrating a damaged rotor disposed in the apparatus.
Figure 2:
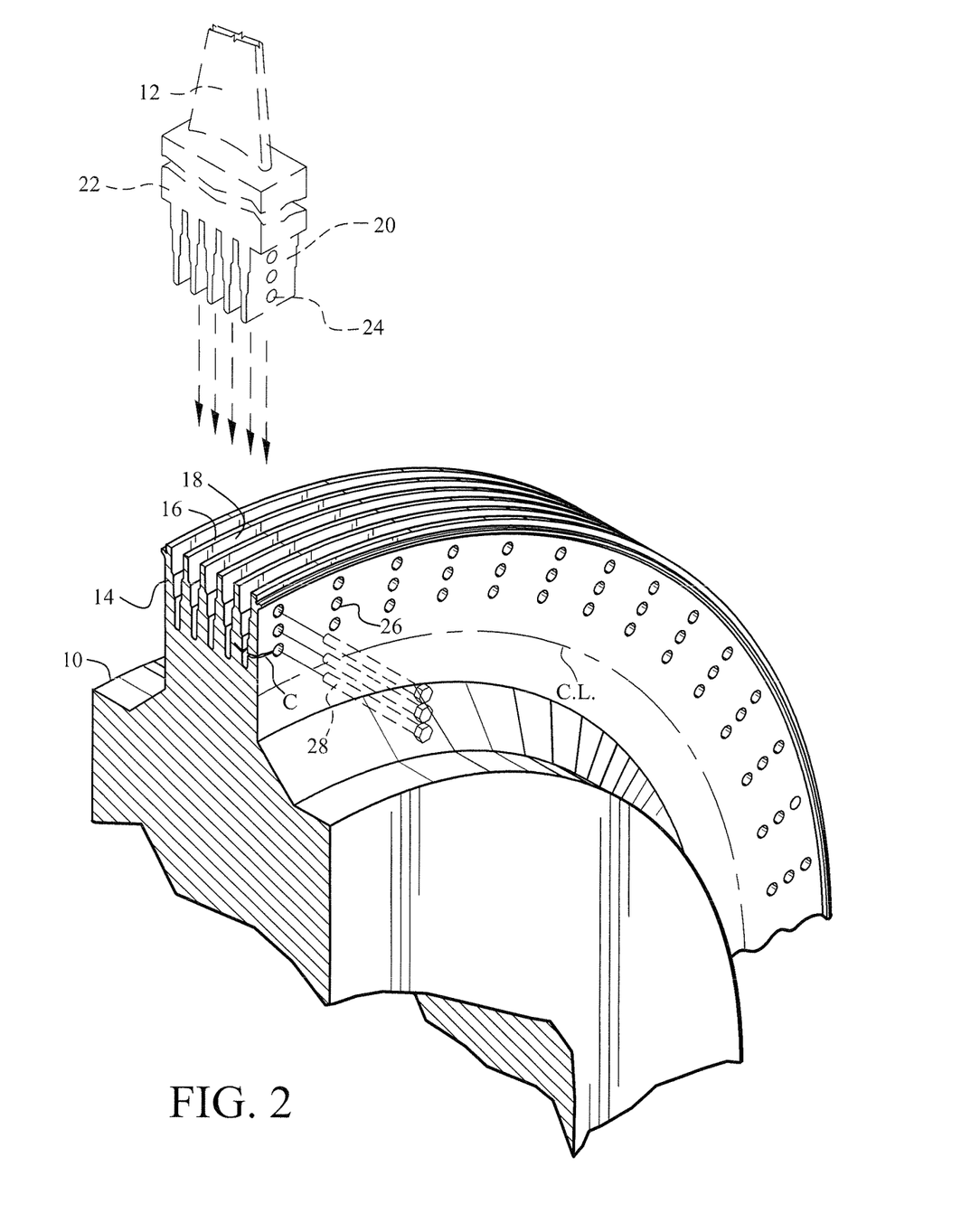
FIG. 2 is a fragmentary, enlarged detail taken from FIG. 1 but shown in perspective, and illustrating a finger-type dovetail connection with turbine wheel buckets.

Referring now to the drawing figures, particularly to FIGS. 1 and 2, there is illustrated a rotor 2 for a turbine, for example, a steam or gas turbine, having a number of stages wherein each stage includes a rotor wheel 10 mounting a plurality of buckets 12 (two stages labeled in FIG. 1). As best illustrated in FIG. 2, each rotor wheel 10 includes a dovetail 14 comprised of a plurality of circumferentially extending, radially outwardly projecting fingers 16 defining grooves 18 therebetween. The grooves 18 receive complementary-shaped dovetail fingers 20 forming part of the bucket dovetail 22. As illustrated, the bucket dovetail 22 has a plurality (three illustrated) of axially registering holes 24 through each finger 20, which, when the bucket dovetail is applied to the dovetail 14 of wheel 10, register with corresponding openings 26. Pins 28 are used to secure the buckets 12 to the wheel 10. It will be appreciated that the bucket dovetails are stacked against one another to form a circumferential array of buckets about the wheel and, in use, lie in the hot fluid path of the turbine.

Also illustrated in FIG. 2 is a crack C in dovetail 14 resulting from occurrence of one or more of the aforementioned failure mechanisms, for example, stress corrosion, creep rupture or cycle fatigue. Because the dovetail 14 lies in the high stress area of the wheel during use, failure invariably occurs in the dovetail 14 before any failure occurs in the remaining radially inward portions of the wheel 10. The present invention therefore involves the removal of the damaged dovetail 14 and its replacement by a forged ring, which has, or can be later machined to have, a new dovetail for engagement by the bucket dovetails 22. As also described herein, a new and more efficient welding process may be employed.

Referring back to FIG. 1, the rotor 2 is shown set up along its horizontal rotational axis in a lathe-type apparatus (e.g., a repair station lathe), generally designated 30. The apparatus includes bearing supports 32 for the rotor, as well as a drive motor M for rotating the rotor R on the bearings 32. The structure 30 also includes a machining center 34, two such machining centers being illustrated, with each machining center having a head for interchangeably mounting a variety of tools, for example, a cutting tool and a milling head for use in the repair process, to be described. The apparatus 30 may be portable, i.e., the apparatus 30 can be transported to the site of the turbine and set up at that site to repair the turbine. Alternatively, of course, the apparatus 30 can be set up at a repair facility and the turbine rotors transported to that facility for repair.

Figures 3, 4:
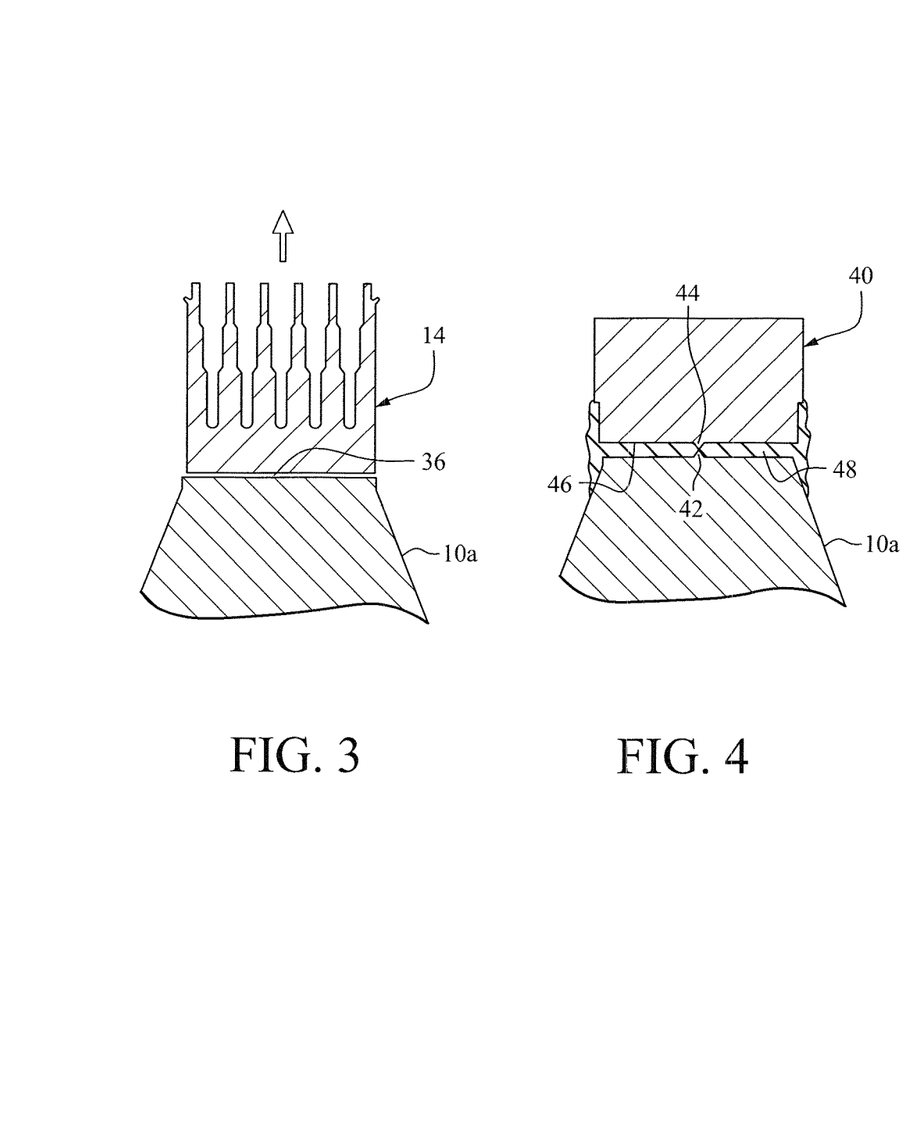
FIG. 3 is a partial side section illustrating removal of a dovetail portion of a turbine wheel.
FIG. 4 is a similar section but illustrating the welding of a replacement ring to the turbine wheel.

While this description of the apparatus and method of the invention goes forward, describing the repair of a single wheel of the rotor R, it will be appreciated that with two or more machining centers 34 and other additional apparatus as detailed below, two or more of the wheels on a single rotor can be repaired simultaneously. The first part of the repair after mounting the rotor in apparatus 30 involves removal of the buckets 12. Next, the damaged dovetail 14 is removed. To accomplish this, a machining center 34 is set up with a cutting tool to remove or cut off the damaged dovetail 14, for example, along the cut line designated C.L. in FIG. 2. Consequently, the entire dovetail 14 about the wheel 10 is removed by continuously rotating the rotor past the cutting tool. The removal of the dovetail 14 leaves a wheel body 10a having a remaining peripheral rim 36 (FIG. 3). In accordance with one aspect of the present invention, a replacement ring 40 (FIGS. 4 and 10), preferably of forged (or cast) material, is manufactured for fit about the rim 36. Ring 40 is provided in a single or in two or more arcuate ring sections, for example, two substantially 180° sections, although it will be appreciated that a complete circular forged or cast ring or more than two ring sections, may be provided in certain circumstances. The material of the forged replacement ring 40 may be the same as or different from the material forming the rotor wheel and may be selected to have properties which increase its resistance to one or more of the failure mechanisms outlined above. For example, the rotor wheel may be formed of Ni—Cr—Mo—V or Cr—Mo—V, while the replacement ring 40 may be formed of 12% CrCb. The replacement ring 40 is provided with or without dovetail grooves. If the ring is provided without grooves, they are later formed by, for example, machining, the ring 40 after the welding operation is completed.

Figure 5:
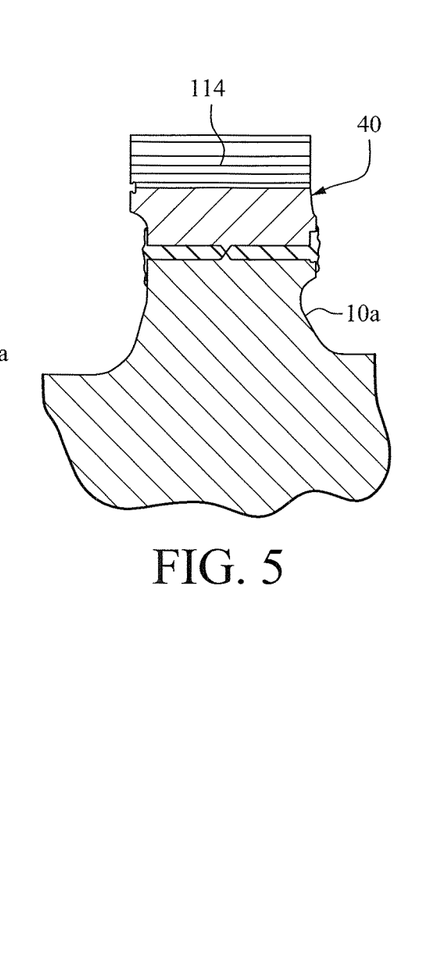
FIG. 5 is a similar section illustrating a machined replacement ring providing a new, finished dovetail configuration.

As apparent from FIGS. 4 and 5, and in accordance with conventional welding, a weld prep is formed on each of the rim 36 and the I.D. of the ring 40. The weld prep may comprise, for example, a radial outward projection 42 formed on the outer rim 36 bearing a central V groove and a radial inward projection 44 formed along the I.D. of the ring 40. With those weld preps centrally located between opposite sides, i.e., axial faces of the ring and the wheel, it will be appreciated that a deep annular groove 46 is provided opening through each axially opposite face of the wheel and ring. The groove is a very narrow groove, on the order of 0.300" and may extend in an axial direction between the axial outer face and the weld prep a substantial distance, e.g., approximately one to twelve inches, dependent upon the wheel undergoing repair.

In context of FIGS. 4 and 5 and the welding process described in the '979 patent, it will be appreciated that the weld is a substantially full-penetration weld, with weld material 48 extending substantially from one side of the wheel to the other. Following welding, individual dovetails 114 are machined into the replacement ring.

As described further below, it has been discovered that the welding operation can be implemented effectively without full-penetration welding. Specifically, the need for a full-penetration weld can be eliminated in favor of a pair of part-penetration welds, which leave a significant portion of the center of the replacement ring/rotor wheel interface hollow.

Figure 6:
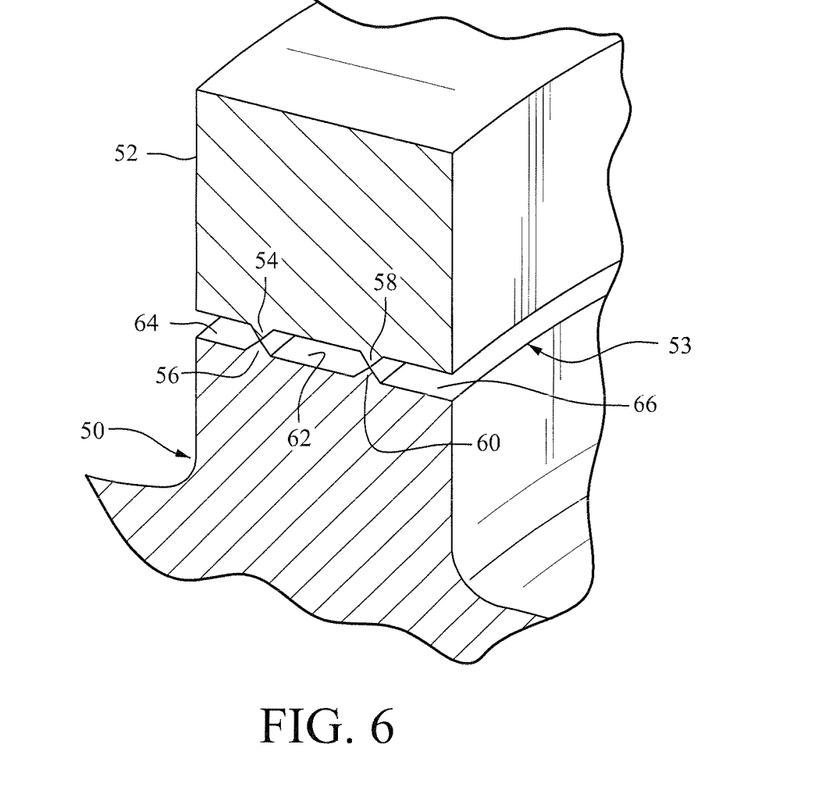
FIG. 6 is a partial section illustrating a turbine wheel and replacement ring prepared for welding in accordance with an exemplary embodiment of the invention.

With reference now to FIG. 6, a turbine rotor wheel 50 is shown to include a dovetail replacement ring 52 on the peripheral rim 53 of the rotor wheel, with weld preps in accordance with the exemplary embodiment of the invention. Weld prep involves forming two pair of aligned projections 54, 56, 58 and 60 across the replacement ring/wheel interface, leaving a discrete space 62 in the center section. During the welding process, weld material is applied from opposite sides of the wheel, the weld material being applied only within the end grooves 64, 66 and penetrating only to the mated projections 54, 56 and 58, 60 such that the discrete space 62 becomes a hollow or void space axially between the partial penetration welds 68, 70 (see FIGS. 7-9). In the exemplary but nonlimiting embodiment, the end grooves 64, 66 and center section 62 may have substantially equal axial length dimensions.

Figure 7:
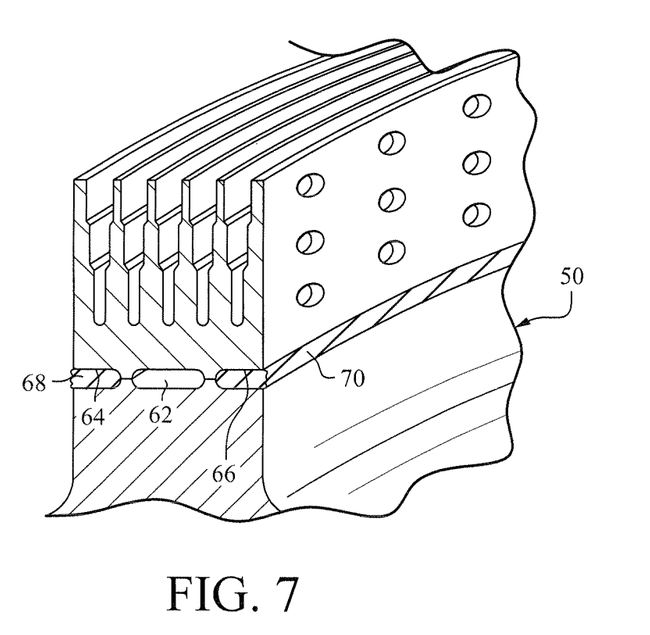
FIGS. 7-9 illustrate partial penetration welds and alternative dovetails machined into respective replacement rings.
Figure 8:
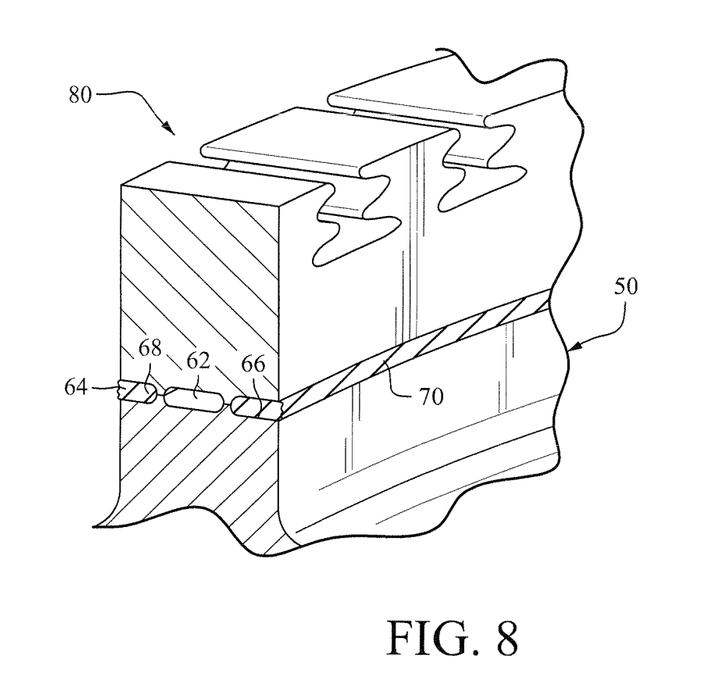
Figure 9:
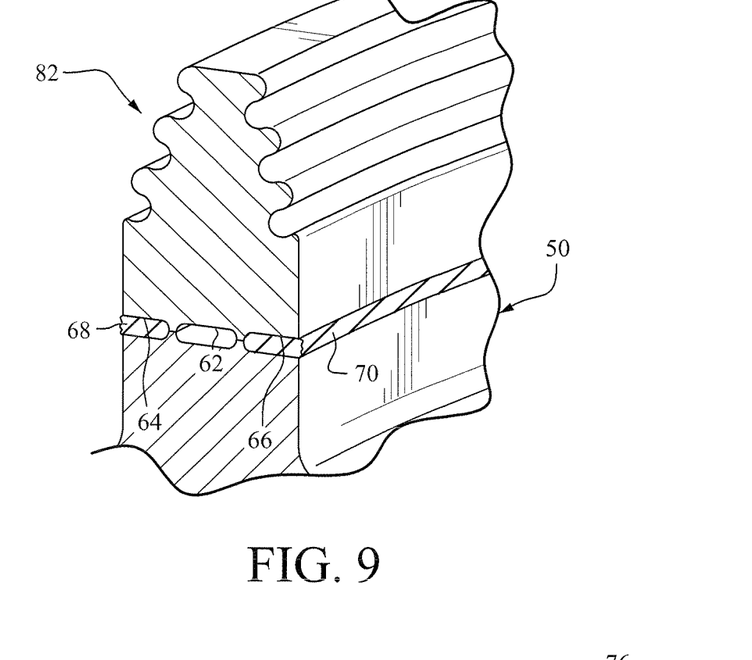

As a result, weld head travel and weld material can be reduced significantly, with the welds 68, 70 lying on opposite sides of the hollow center section 62 (this arrangement mimics the cross section of a simple pipe weld), thus simplifying and reducing the frequency of Nondestructive Examination (NDE) procedures. For example, only side access to the turbine wheel is required for NDE. In addition, the weld cross section is reduced with attendant reduction in opportunities for defects. Partial penetration welding also facilitates welding wider rotor wheels.

The partial penetration weld process described herein also permits pre-machining of the replacement ring forgings to near net shape, i.e., the new, individual dovetails may be formed on the replacement ring prior to welding the ring to the wheel, with only finish-machining required post welding. It will be understood, of course, that machining the new dovetail may also occur entirely after the replacement ring is welded in place.

The welding process described herein is applicable to both split or segmented replacement rings, and full 360° replacement rings. If the wheel dovetail to be repaired is located between other rotor wheels, it may be necessary to utilize a segmented replacement ring in light of difficulties in accessing the wheel. If, on the other hand, the wheel dovetail to be repaired is located at either end of the rotor, a full annular replacement ring may be used.

Figure 10:
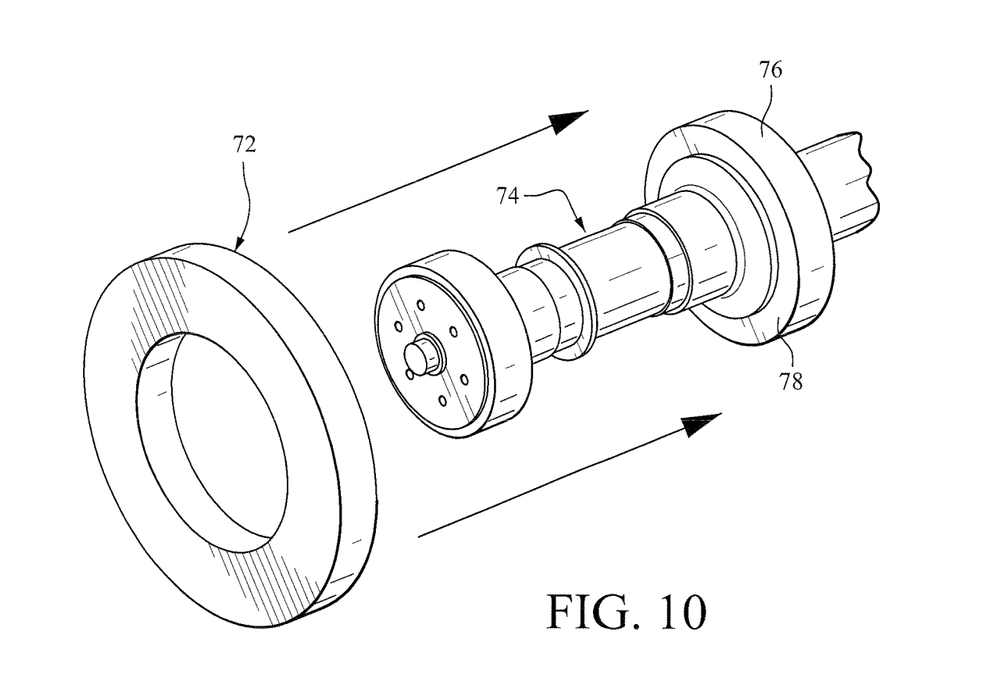
FIG. 10 is a simplified exploded perspective view illustrating how the replacement ring is telescoped over one end of a rotor to facilitate welding to the peripheral rim of a turbine wheel from which a damaged dovetail has been removed.

FIG. 10 shows the manner in which a full, 360° replacement ring 72 (or a pre-welded split ring) can be telescoped over one end of a rotor 74 and located on a peripheral rim 76 of a turbine wheel 78 for welding to the rim as described above.

In the case of split or segmented rings (typically, two substantially 180° segments, but more than two segments are possible, and the exact arcuate extent of the segments may vary), the ring segments may be butt-welded before or after placement about the rotor wheel peripheral rim, depending on the location of the wheel along the rotor. If butt-welded prior to placement on the peripheral rim, the replacement ring is subject to the limitations noted above with respect to location/access to the wheel to be repaired. When the segments are located on the peripheral rim before butt-welding, the segments may be welded to the peripheral rim first and then butt-welded to each other, as described in the '979 patent. Utilizing the partial penetration welding as described herein, the hollow center portion of the weld about the annular interface between the peripheral rim and the replacement ring ID remains hollow, and the butt welds at the opposed faces of the segments are full-penetration welds from the hollow sections adjacent the IDs of the replacement ring segments to the ODs of the replacement ring segments. It will be understood, however, that, with modified weld prep, the butt welds could extend across the entirety of the opposed segment faces, interrupting the hollow sections at the segment joints.

In any event, the term "replacement ring" as used herein, embraces segmented rings and one-piece forged or cast rings.

It has also been determined that the utilization of replacement rings, and particularly full, 360° rings, permit accommodation of new design changes with respect to, for example, the dovetail configurations machined into the ring after the ring is welded to the rotor wheel. Thus, with reference to FIGS. 7-9, it is possible to alter the dovetail configuration after the replacement ring is welded in place. For example, if the original dovetail configuration was of the finger-type (FIG. 7), the replacement ring can be machined to have male or female pine-tree dovetail configuration for tangentially- or axially-installed buckets as shown in FIGS. 8 and 9, respectively, at 80 and 82.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of repairing a damaged dovetail on a peripheral portion of a turbine wheel comprising the steps of:
    (a) removing buckets from the dovetail;
    (b) removing a damaged dovetail from the peripheral portion of the turbine wheel, leaving a rotor wheel body having a peripheral rim;
    (c) disposing a replacement ring about said peripheral rim, said replacement ring and said peripheral rim defining therebetween a pair of end grooves and a center section; and
    (d) welding the replacement ring to said peripheral rim, with weld material applied only within said end grooves, leaving a void in said center section.

2. The method of claim 1 wherein said replacement ring comprises a one-piece 360° annular ring, and during step (c), said replacement ring is telescoped over an end of a rotor supporting the turbine wheel, and located on said peripheral rim.

3. The method of claim 1 wherein said replacement ring is comprised of a pair of substantially 180° segments welded together before or after step (c).

4. The method of claim 1 including, after step (d), machining a new dovetail in said replacement ring.

5. The method of claim 4 wherein said new dovetail has a substantially identical configuration as the dovetail removed in step (b).

6. The method of claim 4 wherein said new dovetail has a substantially different configuration as the dovetail removed in step (b).

7. The method of claim 1 wherein said turbine wheel is formed of a first material and said replacement ring is composed of a second material having different properties than said first material.

8. The method of claim 1 wherein said center section has a length substantially equal to or greater than lengths of each of said end grooves.

9. The method of claim 1 including machining at least part of a new dovetail in said replacement ring before step (d).

10. A method of repairing a turbine rotor wheel dovetail comprising the steps of:
    (a) removing buckets from the dovetail;
    (b) removing the dovetail from a peripheral portion of the turbine wheel, leaving a rotor wheel body having a radially-outer peripheral rim of a first material;
    (c) disposing a one-piece 360° replacement ring of a second different material about said wheel body, and engaged with said peripheral rim, said replacement ring and said peripheral rim having an interface defined by a pair of end grooves and a hollow center section; and
    (d) welding the replacement ring to said rotor wheel, with weld material applied only within said end grooves, leaving a void in said center section.

11. The method of claim 10 wherein said replacement ring is formed by forging.

12. The method of claim 10 including, after step (d), machining a new dovetail in said replacement ring.

13. The method of claim 12 wherein said new dovetail has a substantially identical configuration as the dovetail removed in step (d).

14. The method of claim 12 wherein said new dovetail has a substantially different configuration as the dovetail removed in step (d).

15. A turbine rotor wheel comprising:
    an outer dovetail portion formed on a replacement ring having an radially inward surface perpendicular to an axis of rotation of the turbine rotor wheel;
    a wheel body portion having a peripheral rim having a surface perpendicular to the axis of rotation,
    a welded interface between the radially inward surface of the replacement ring and the peripheral rim of the wheel, wherein the welded interface is formed by a pair of partial-penetration welds in an annular gap between the radially inward surface and the peripheral rim, and each of the partial-penetration welds extends from a respective side of the wheel into the annular gap; and
    a hollow center section in the annular gap, wherein the hollow center section separates the partial-penetration welds along a direction parallel to the axis of rotation.

16. The turbine rotor wheel of claim 15 wherein said partial penetration welds extend axially from opposite side faces of the turbine rotor wheel.

17. The turbine rotor wheel of claim 15 wherein said outer dovetail portion comprises a forged ring and wherein said forged ring and said turbine rotor wheel are composed of substantially identical materials.

18. The turbine rotor wheel of claim 15 wherein said outer dovetail portion comprises a forged ring and wherein said forged ring and said turbine rotor wheel are composed of different materials.

19. The turbine rotor wheel of claim 17 wherein said forged ring is a single-piece, 360° annular ring.

20. The turbine rotor wheel of claim 15 wherein said hollow center section has an axial length dimension substantially equal to or greater than axial length dimensions of each partial-penetration weld.

* * * * *